June 16, 1925.  1,541,909
B. F. EARLY
SHOCK ABSORBER FOR BED BOTTOMS AND THE LIKE
Filed July 14, 1923
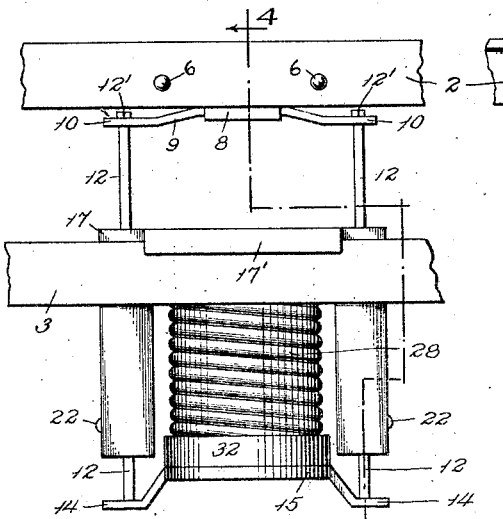
Fig. 1.
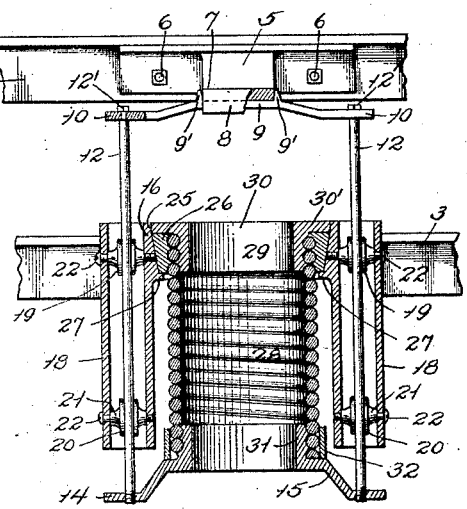
Fig. 2.
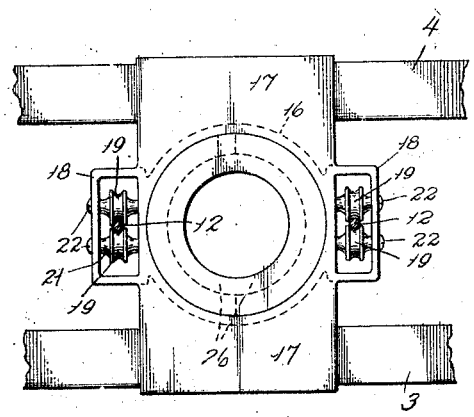
Fig. 3.
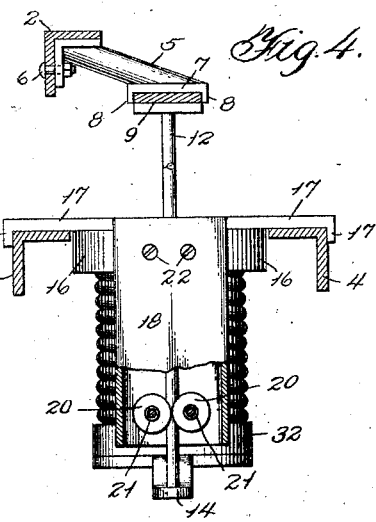
Fig. 4.
Inventor.
Bartholomew F. Early.
Attorney.

Patented June 16, 1925.

1,541,909

UNITED STATES PATENT OFFICE.

BARTHOLOMEW F. EARLY, OF BOSTON, MASSACHUSETTS.

SHOCK ABSORBER FOR BED BOTTOMS AND THE LIKE.

Application filed July 14, 1923. Serial No. 651,561.

*To all whom it may concern:*

Be it known that I, BARTHOLOMEW F. EARLY, a citizen of the United States, residing at Brighton Station, Boston, in the county of Suffolk and State of Massachusetts, have invented certain new and useful Improvements in Shock Absorbers for Bed Bottoms and the like, of which the following is a specification.

An object of the invention is to provide a shock absorbing support for bed bottoms and the like, though it will be understood that the invention is applicable to other structures than beds where it may be necessary to modify a blow, the fall of objects and the like, such as on vehicles, machinery, and furniture of various kinds, etc.

With this and other objects in view as will be more fully pointed out as the description progresses, reference will be had to the accompanying drawing forming a part of this specification and wherein like numerals of reference designate corresponding parts throughout the several views, in which:—

Fig. 1 is a view in side elevation,

Fig. 2 is a vertical sectional view,

Fig. 3 is a top plan view, with parts removed, and

Fig. 4 is a vertical sectional view, taken on line 4—4 of Fig. 1.

In the accompanying drawing, reference numeral 2 designates the supported member, which may be the frame of a bed bottom, chair, vehicle body, or other member to be yieldingly supported. Reference numerals 3 and 4 designate parts of the supporting member or members, and may be the side rails 3 of a bed, chair, vehicle or similar device, with supplemental rails 4 placed parallel therewith. In the present showing, these rails 2, 3 and 4 all take the form of angle bars, but obviously they may be of any cross sectional shape, and in instances, the rails 3 and 4 may be separate or integral with each other.

Secured to the vertical wall of the angle rail 2 is the angle end of a bracket 5, bolts 6 being employed as the fastening means though rivets and the like may be substituted therefor. The bracket arm 5 extends obliquely downwardly from said side rail 2 a short distance and terminates in a foot 7 provided with confining flanges 8. Yoke 9 having confining flanges 9' is received between the flanges 8 of the said bracket and in turn, the bracket is received between the flanges 9' of the yoke, thus forming an inter-seating fit between the bracket and yoke. No positive connecting element is shown, but it is quite apparent the bracket and yoke may readily be positively fastened together should it be so desired, as by passing a bolt through the said parts. The yoke has oppositely extending ears 10, perforated to receive reduced ends of vertical guide rods 12, the upper ends of said rods having terminal nuts 12' threaded thereon. These rods 12 extend parallel to each other and have their lower ends threaded in ears 14 which extend laterally on opposite sides from a bottom ring 15, to be further described.

An upper ring 16 is provided with an integral top plate or member in the nature of two oppositely extending horizontal arms 17 which rest upon the parallel rails 3 and 4 and have terminal flanges 17' hooking over the outer edges of said rails to prevent displacement of the device. On opposite sides of and integral with the top ring 16 are provided downwardly extending parallel tubular guideways 18, through which pass the said guide rods 12, and these guideways 18 are provided with guide rollers 19 and 20, the former being arranged above the latter in pairs and each pair of rollers receiving between them the guide rods 12, said rollers being grooved to conform to the contour of said rods. These rollers are provided with integral or separate washers 21 which engage the inner walls of the guideways and through each roller passes a pintle 22. These pintles may be in the form of slotted headed bolts with their shanks passing freely through the outer walls of the guideways and their inner ends threaded in the inner walls of the guideways, or they may be otherwise shaped and secured in place.

The top ring 16 is provided with a central tapered opening 25, and within this opening seats a ring 26 having an outer tapered face conforming to the tapered face of the opening 25, and this ring rests upon a supporting projection or flange 27 of the top ring.

The interior face of the ring 26 is spirally grooved to receive the upper coils of a coil spring 28, and the same coils are also received within spiral grooves formed on the exterior face of a core portion 29 of a plug 30 having a flange 30' resting on top of the coil spring 28 and engaging the wall 25 of the opening in the top ring. This flange 30' also rests on top of the ring 26, and because of this ring 26 being formed in two or more sections as illustrated by dotted lines in Fig. 3, forces said ring 26 downwardly along the tapered wall 25 and upon the seat 27, thereby compressing the sections of the ring 26 upon the upper coils of the spring 28 to positively confine such coils between said ring 26 and core 29. The lower end coils of the spring 28 are received in a spiral groove formed on the core portion 31 of the bottom ring 15, and may be confined within said groove by means of a ferrule 32 surrounding said coils.

When the supported member 2 receives weight or a blow or is otherwise depressed, the guide rods 12 move downwardly between the guide rollers 19, 20, and force the lower ring 15 downwardly, thereby extending the coil spring 28, which counteracts such depressing force.

Of course it will be understood that the rods 12 may be of any desired length, or if it is desired to support a part of the member 2 at a different plane from another part of said member 2, this may be accomplished by lengthening the rods 12 of the shock absorbing member placed at that point. An example of the necessity for this is when the sleeper on one side of a bed is heavier than the sleeper on the other side of the bed. The spring 28 may be varied in diameter or length or as to size of wire used according to conditions, and various other changes made in the different parts of the structures as will not be in conflict with the spirit and scope of the claims.

What is claimed:—

1. In combination, a supporting member comprising parallel members, a body member supported on said members, a coil spring having its upper end connected with said body member, guideways depending from said body member on opposite sides of said spring, a supported member, a pair of parallel guide rods depending from said supported member, and means connecting the lower ends of said rods with the lower end of said spring.

2. A supporting member and a supported member, an elastic supporter for the latter comprising a spiral spring, a ring having external spiral grooves to engage the upper end coils of said spring, another ring internally grooved and formed in sections surrounding said upper coils and externally downwardly tapering, a third ring adapted to receive said last named ring and having arms adapted to rest upon the supporting member, an externally grooved ring engaging the lower end coils of said spring and having arms, a yoke connected with the supported member, and rods connecting said yoke and said arms.

3. In combination, a supporting member and a supported member, an elastic supporter for the latter comprising a spiral spring, a ring having external spiral grooves to engage the upper end coils of said spring, another ring internally grooved and formed in sections surrounding said upper coils and externally downwardly tapering, a third ring adapted to receive said last named ring and having arms adapted to rest upon the supporting member, an externally grooved ring engaging the lower end coils of said spring and having arms, a yoke, and rods connecting said yoke and said arms, and anti-friction rolls carried by said supporting member to guide said rods.

4. In combination, a supported member, a supporting member, a body member resting on said supporting member and having a downwardly inwardly tapering recess, a ring spirally grooved internally and formed in sections and having a downwardly inwardly tapered outer face, said sectional ring being received in said body recess, an externally spirally grooved ring resting on said first ring, a coil spring having its upper end coils arranged between said rings and within the spiral grooves thereof, a pair of opposite depending guideways on said body member, anti-friction rollers therein, guide rods extending through said guideways and between rollers, an externally spirally grooved yoke receiving the lower end coils of said spring in its spiral groove and having connection with the lower ends of said rods, and a yoke having connection with the supported member and with the upper ends of said rods.

5. In combination, a supporting member comprising parallel side bars, a body member supported on said parallel members, a coil spring having its upper end connected with said body member and disposed between said parallel members, tubular guideways depending from said body member, one on each side of said spring, a supported member, a pair of parallel guide rods rigid with said supporting member, depending therefrom and extending through the tubular guide members and means carried by the lower end of said spring to which the guide rods are anchored at their lower ends.

6. In combination, a supporting member, a supported member, a coil spring anchored at its upper end to the supporting member and depending therefrom, a vertical housing at opposite sides of the spring, anti-friction rollers journaled in said housing with the rollers arranged in pairs and with the pairs of rollers in spaced relation, guide rods depending from the supporting member and extending through said housings between the rollers of each pair and means carried by the lower end of the spring to which the lower ends of the rods are secured.

In testimony whereof I affix my signature.

BARTHOLOMEW F. EARLY.